United States Patent [19]

Sigai

[11] Patent Number: 5,151,215
[45] Date of Patent: Sep. 29, 1992

[54] PRE-WATER-BASED SUSPENSION ALUMINA COATED PHOSPHOR TREATMENT PROCESS

[75] Inventor: A. Gary Sigai, Lexington, Mass.

[73] Assignee: GTE Products Corporation, Danvers, Mass.

[21] Appl. No.: 805,271

[22] Filed: Dec. 9, 1991

Related U.S. Application Data

[63] Continuation-in-part of Ser. No. 746,162, Aug. 14, 1991, abandoned, which is a continuation of Ser. No. 306,129, Feb. 6, 1989, abandoned.

[51] Int. Cl.$^5$ .............................................. C09K 11/59
[52] U.S. Cl. .............................. 252/301.6 F; 427/64; 427/67; 427/213; 427/215; 427/372.2
[58] Field of Search ................... 252/301.6 F; 427/64, 427/67, 213, 215, 372.2

[56] References Cited

U.S. PATENT DOCUMENTS

| | | | |
|---|---|---|---|
| 4,585,673 | 4/1986 | Sigai | 427/213 |
| 4,710,674 | 12/1987 | Sigai | 313/489 |
| 4,803,400 | 2/1989 | Peters et al. | 313/489 |
| 4,806,389 | 2/1989 | Peters et al. | 427/215 |

Primary Examiner—Jack Cooper
Attorney, Agent, or Firm—Frances P. Craig; Carl F. Ruoff

[57] ABSTRACT

A method for eliminating carbonaceous contaminants and preventing the hydration/solubilization of the alumina protective coating of a phosphor is described. The method involves the heating a fluidized alumina coated phosphor in a fluidized bed at a temperature and for a period of time sufficient to preclude adversely affecting the protective oxide coating on the phosphor during subsequent water-based suspension processing without detrimentally altering the phosphor. After heating the fluidized phosphor is cooled and then added to a water-based suspension. The conditions for treating a manganese activated zinc silicate phosphor having a protective alumina coating are heating the fluidized phosphor at a temperature between about 700° C. and about 850° C. for a period of time from about 15 minutes to about 20 hours.

A fluorescent lamp containing the phosphor prepared by the above described method is also described.

3 Claims, 2 Drawing Sheets

PRE-WATER-BASED SUSPENSION ALUMINA COATED PHOSPHOR TREATMENT PROCESS

This is a continuation-in-part of copending application Ser. No. 07/746,162, filed on Aug. 14, 1991, now abandoned, which is a continuation of application Ser. No. 07/306,129, filed on Feb. 6, 1989, and now abandoned.

FIELD OF THE INVENTION

This invention relates to a method of treating a phosphor. More particularly, this invention relates to a method of treating an alumina coated phosphor.

BACKGROUND OF THE INVENTION

In the fabrication of fluorescent lamps a phosphor layer is coated on the interior surface of a glass lamp envelope using a paint-like suspension of phosphor powder. Although the composition of the suspension varies from manufacturer-to-manufacturer, the composition usually includes, in addition to the phosphor, a film forming binder, solvent(s) for the binder, and if necessary surfactants, defoamers and wetting agents. Most non-phosphor components of the coating suspension interfere with efficient lamp operation and longevity, and must be removed by pyrolysis in a manufacturing step known as "lehring". Another inorganic, non-fluorescent, component of the coating suspension is a submicron particle sized material, such as silicic acid or alumina, which helps bind the phosphor to the glass after the "lehr" process has removed the organics. Butler in his book, *Fluorescent Lamp Phosphors, Technology and Theory*, Penn State University Press (1980), gives a rather complete description of lamp coating technology and its evolution from the nitrocellulose and ethlycellulose-type lacquers to the newer polymeric binders that employ water as the solvent in place of the environmentally objectionable and flammable organic compounds. Depending on the chemical composition of the phosphor and method of preparation, phosphors may exhibit some differences in performance depending on whether they are deposited from organic-based suspension or from water-based suspension systems. Usually these differences are not significant unless the phosphor has a tendency to react chemically with one of the suspension components.

A variety of technologies have been described recently, i.e., U.S. Pat. Nos. 4,585,673 and 4,710,674, disclose the coating of phosphor particles with a thin film of a refractory oxide. This film can be made from a choice of different refractory oxides. Some of these, particularly $Al_2O_3$ and $Y_2O_3$, have been found effective in protecting the phosphor against processes that cause lumen depreciation in fluorescent lamps. One example of such a protective coating, is that described in U.S. Pat. No. 4,710,674, in which the phosphor particles were coated with $Al_2O_3$ by pyrolizing an aluminum alkyl in a fluidized bed of phosphor powder. Experimental fluorescent lamps employing such coated phosphors, particularly those using $Zn_2SiO_4$:Mn (Willemite) have shown significant improvements in lumen maintenance relative to lamps employing uncoated phosphors. Lamp test data also indicate that $Al_2O_3$ coated $Zn_2SiO_4$:Mn phosphors perform equally well with regard to luminance and lumen maintenance when applied to the lamp envelope from freshly prepared organic or water-based suspensions. If, however, the $Al_2O_3$ coated $Zn_2SiO_4$:Mn phosphor is applied from a water-based suspension that has been held-over for several days before use, the beneficial effects associated with the oxide coating are lost. This presents a serious obstacle to the commercialization of lamps based on the coated phosphor technology. Government regulations have already eliminated the use of organic-based phosphor suspensions in many parts of the world, and reintroduction and/or expansion of this old technology is therefore not a viable option. Moreover, the use of only freshly prepared water-based phosphor suspensions is precluded by the short useful life of these suspensions and by the cost of disposing large quantities of aged suspensions that would be generated in a modern automated lamp manufacturing facility. Therefore, it is desirous to provide a more cost effective method which will improve the useful life of water-based phosphor suspension.

One method to overcome the short useful life of the water-base suspension is described in U.S. Pat. No. 4,803,400 entitled "Pre-Water-Based Suspension Phosphor Treatment," assigned to the same assignee as the present invention. The patent discusses the batch annealing of a alumina coated phosphor in a box furnace at temperatures from 700° C. to 950° C. Precise control of the temperature of the phosphor powder in a batch annealing process which uses boats to hold the powder becomes more difficult as the boat size is scaled up.

SUMMARY OF THE INVENTION

In accordance with one aspect of the present invention, a new and improved method for the treatment of an alumina coated phosphor and having a particle size of about 10–12 microns comprises the following steps:

Step 1—A phosphor having an alumina protective coating is fluidized in an isothermal fluidized bed to form a fluidized phosphor powder.

Step 2—The fluidized phosphor powder from Step 1 is heated at a temperature from about 700° C. to about 850° C. and for a period of time sufficient to preclude adversely affecting the alumina protective coating on the phosphor during subsequent water-based suspension processing and to preclude detrimentally altering the phosphor to form an annealed phosphor powder.

Step 3—The annealed phosphor powder from step 2 is cooled to form a cooled annealed phosphor powder.

Step 4—The cooled annealed phosphor powder from step 3 is added to a water-based suspension.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
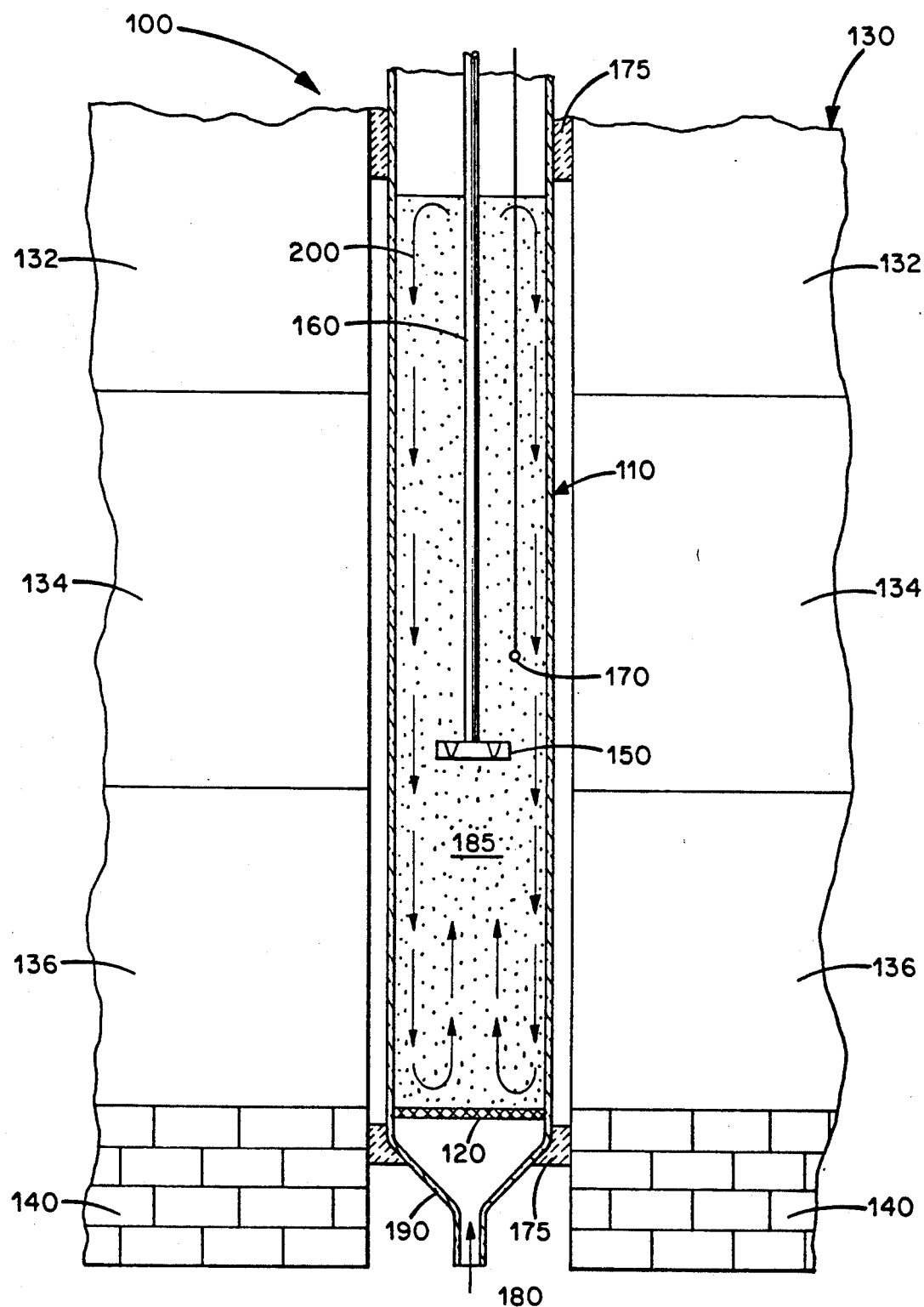
FIG. 1 is a cross-sectional representation of a fluid bed apparatus used in accordance with the present invention.
Figure 2:
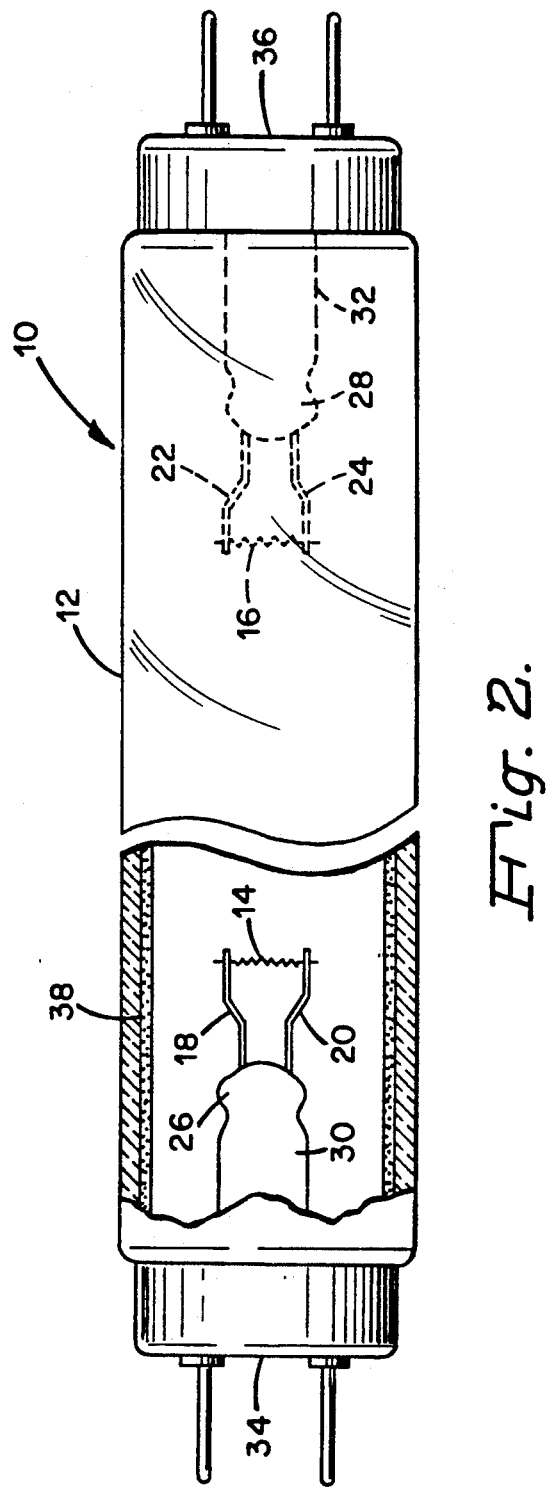
FIG. 2 is a view of a fluorescent lamp, partially in section, diagrammatically illustrating an embodiment of the present invention.

An alumina coated phosphor such as a manganese activated zinc silicate phosphor coated with an alumina protective coating in accordance with the procedures described in U.S. Pat. Nos. 4,585,673 and 4,710,674 and incorporated herein by reference is placed in a fluidized bed apparatus 100. The alumina coated phosphor is a fine phosphor powder with a particle size of about 10-12 microns. The fluidized bed apparatus 100 comprises quartz column 110, 80 mm in diameter, with quartz frit 120 fused to the bottom of quartz column 110. Quartz column 110 is positioned in tube furnace 130 having three heating zones 132, 134, and 136 as indicated in FIG. 1. The space between quartz column 110 and the top and bottom of tube furnace 130 is closed with insulation 175. Quartz frit 120 is located at the junction of the bottom heating zone 136 and firebrick packing 140. Quartz disc agitator 150, one and a quarter inch in diameter, is positioned within the quartz column 110 as indicated in FIG. 1. Quartz shaft 160 is attached to the top of quartz disc agitator 150. Quartz disc agitator is located 165 mm from the top of quartz frit 120 and thermocouple 170 is located 65 mm above quartz disc agitator 150. Quartz disc agitator 150 vibrates the alumina coated phosphor and a gas 180 is injected into quartz column 110 through quartz frit 120 fluidizing the phosphor within quartz column 110 as indicated in FIG. 1. forming fluidized phosphor 185 which insures a uniform heating of fluidized phosphor 185 during the heating cycle. During the heating cycle the three heating zones 132, 134, and 136 are run at the same temperature.

Throughout the heating and annealing cycle the fluidized phosphor 185 exhibited good fluidization and moved within quartz column 110 as indicated by arrows 200 as depicted in FIG. 1. The annealing cycle of fluidized phosphor 185 begins by heating fluidized phosphor 185 to a temperature and for a period of time sufficient to preclude adversely affecting the alumina protective coating on the phosphor during subsequent water-based suspension processing and to preclude detrimental altering the phosphor. The temperature of fluidized phosphor 185 obtained during the annealing cycle is about 700° C. to about 850° C., more preferably about 750° C. to about 770° C. The period of time at the annealing temperature is about 15 minutes to about 20 hours, more preferably from about 1 hour to about 4 hours. The annealed phosphor is cooled to room temperature placed in a water-based suspension and then processed into fluorescent lamps.

Shown in FIG. 4 is a fluorescent lamp 10, such as a 40W-T12 fluorescent lamp. Lamp 10 comprises an elongated sealed glass envelope 12 of circular cross section containing electrodes 14 and 16 at each end supported by lead-in wires 18, 20 and 22, 24, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer 38 of the annealed phosphor, such as an alumina coated annealed manganese activated zinc silicate phosphor annealed in accordance with the present invention.

A phosphor coating suspension is prepared by dispersing the phosphor particles in a water base system employing polyethylene oxide as the binder with water as solvent. The phosphor coating suspension is held for more than three days before applying the suspension to envelope 12.

After the holdover, the phosphor coating suspension was applied in the usual manner by causing the suspension to flow down the inner surface of envelope 12 and allowing the water to evaporate, leaving the binder and phosphor particles adhered to the envelope 12 wall. The phosphor coated envelope 12 is then heated in a lehr to volatilize the organic components, the phosphor layer 38 remaining on the envelope 12 wall. Envelope 12 is then processed into a fluorescent lamp by conventional lamp manufacturing techniques.

EXAMPLE 1,340 grams of a manganese activated zinc silicate phosphor coated with a protective alumina coating in accordance with the procedures described in U.S. Pat. Nos. 4,585,673 and 4,710,674 incorporated herein by reference was fluidized in quartz column 110 of fluidizing apparatus 100. The fluidization was accomplished by injection of gas 180, such as a mixture of nitrogen and oxygen, into base 190 of quartz column 110 through quartz frit 120. The flow rates of the nitrogen and the oxygen were 1,600 cc/min $N_2$ and 400 cc/min $O_2$.

After the phosphor was fluidized, it was heated to about 784° c. within approximately one hour followed by a decrease in temperature to about 766° C. within 10 minutes. The temperature was maintained at about 768° C., ranging from about 762° C. to about 772° C. for about 4 hours. After the heating cycle was completed the fluidized phosphor was cooled to rom temperature in about 1 hour to form a cooled annealed alumina coated manganese activated zinc silicate phosphor.

A phosphor coating suspension was prepared by dispersing the phosphor particles in a water base system employing polyethylene oxide as the binder with water as solvent. The phosphor coating suspension was held for fifteen days before applying the suspension to a fluorescent lamp envelope.

After a holdover time of fifteen days, the phosphor coating suspension was applied in the usual manner by causing the suspension to flow down the inner surface of a fluorescent lamp envelope and allowing the water to evaporate, leaving the binder and phosphor particles adhered to the envelope wall. The phosphor coated envelope was then heated in a lehr to volatilize the organic components, the phosphor layer remaining on the envelope wall. The fluorescent lamp by conventional lamp manufacturing techniques. The fluorescent lamps were then evaluated.

The average percent maintenance of the fluorescent lamps in operation for 500 hurs was 96% which is an excellent result. This is compared to the very poor maintenance, approximately 60% at 100 hours of operation, for fluorescent lamps prepared from a manganese activated zinc silicate phosphor coated with a protective alumina coating which was not annealed.

What is claimed is:
1. An alumina coated phosphor treatment process comprising the following steps:
   step 1—fluidizing a manganese activated zinc silicate phosphor having an alumina protective coating and having a particle size of about 10-12 microns in an isothermal fluidized bed to form a fluidized phosphor powder, the alumina coating having been applied through chemical vapor deposition;
   step 2—heating said fluidized phosphor powder to form an annealed phosphor powder, wherein said heating is carried out at a temperature from about 200° C. to about 850° C. and for a period of time sufficient to preclude adversely affecting said alumina protective coating of said phosphor during subsequent water-based suspension processing and to preclude detrimentally altering said phosphor;

step 3—cooling said annealed phosphor powder from step 2 to form a cooled annealed phosphor powder; and step 4—adding said cooled annealed phosphor powder from step 3 to a water-base suspension.

2. An alumina coated phosphor treatment process in accordance with claim 1 wherein said period of time being from about 15 minutes to about 20 hours.

3. An alumina coated phosphor treatment process in accordance with claim 1 wherein said temperature in Step 2 being from about 750° C. to about 770° C. and said period of time being from about 1 hour to about 4 hours.

* * * * *

UNITED STATES PATENT AND TRADEMARK OFFICE
CERTIFICATE OF CORRECTION

PATENT NO. : 5,151,215
DATED : September 29, 1992
INVENTOR(S) : A. Gary Sigai

It is certified that error appears in the above-identified patent and that said Letters Patent is hereby corrected as shown below:

<u>Column 4,</u>
Line 68, the temperature "200º C." should read -- 700º C. --.

Signed and Sealed this

Thirteenth Day of January, 2004

JON W. DUDAS
*Acting Director of the United States Patent and Trademark Office*